Jan. 13, 1925.
P. RICHERT
1,522,910
TAXIMETER
Filed April 18, 1922 10 Sheets-Sheet 1
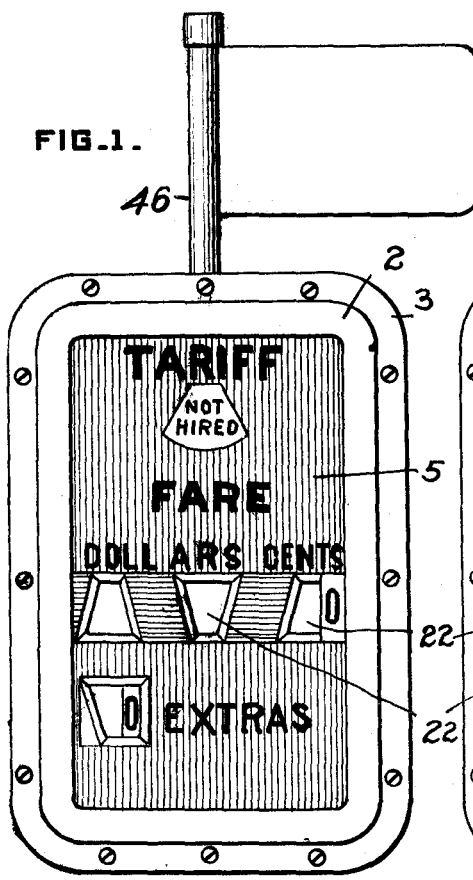
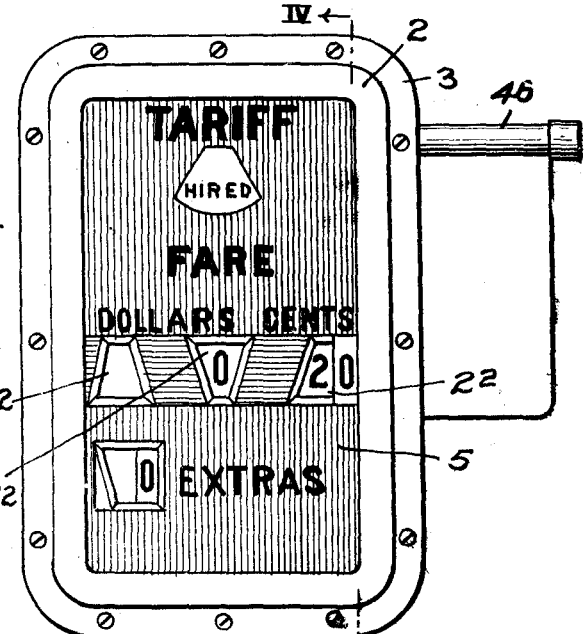
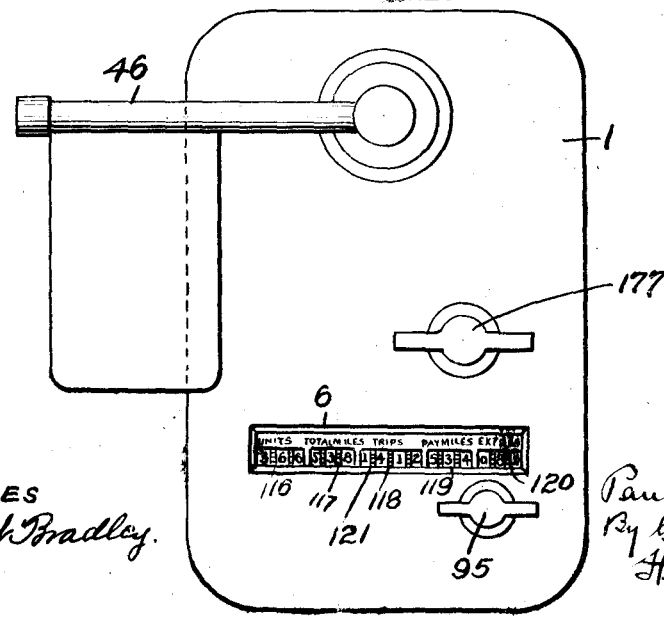
WITNESSES
J. Herbert Bradley
INVENTOR
Paul Richert
By Green and McCallister
His Attorneys

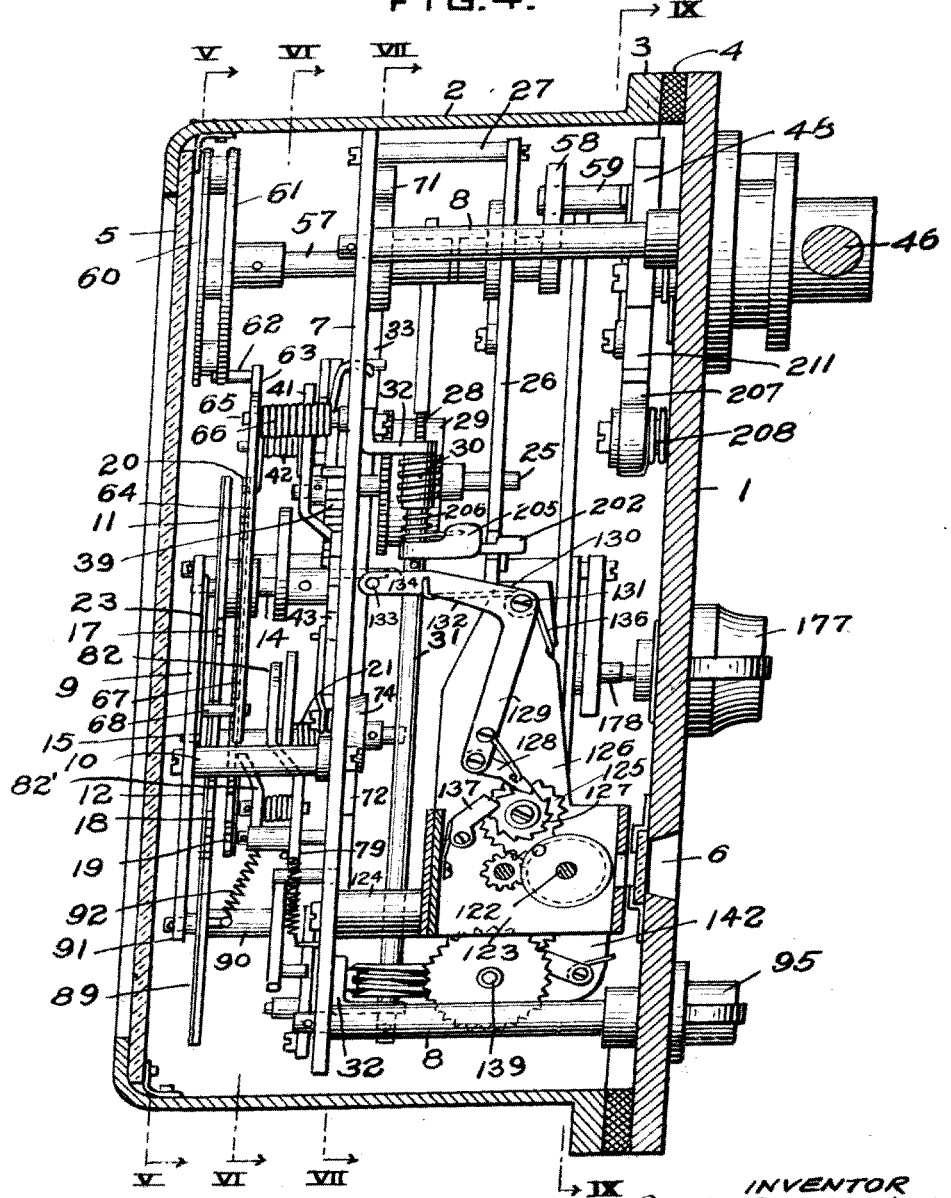

Jan. 13, 1925.  1,522,910
P. RICHERT
TAXIMETER
Filed April 18, 1922  10 Sheets-Sheet 3

WITNESSES
J. Herbert Bradley

INVENTOR
Paul Richert
By Green and McCallister
His Attorney

Jan. 13, 1925.

P. RICHERT 1,522,910

TAXIMETER

Filed April 18, 1922    10 Sheets-Sheet 4

Jan. 13, 1925.

P. RICHERT 1,522,910

TAXIMETER

Filed April 18, 1922 10 Sheets-Sheet 5

WITNESSES
J. Herbert Bradley.

INVENTOR
Paul Richert
By Greene & McCallister
His Attorneys

Jan. 13, 1925.
P. RICHERT
TAXIMETER
Filed April 18, 1922
1,522,910
10 Sheets-Sheet 8

WITNESSES
J. Herbert Bradley

INVENTOR
Paul Richert
By Green and McCallister
His Attorneys

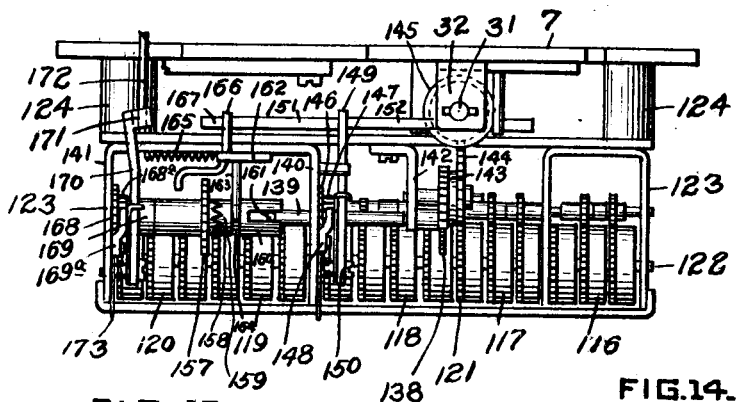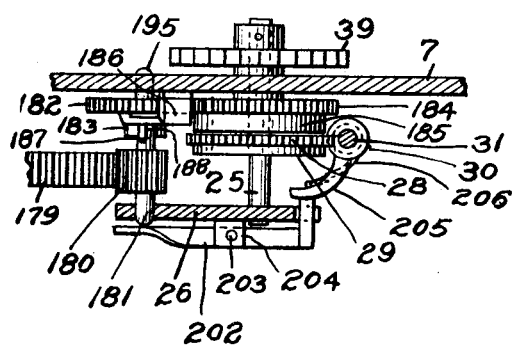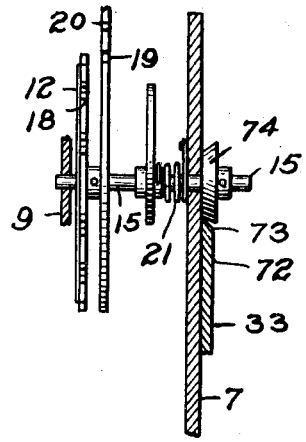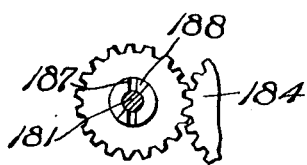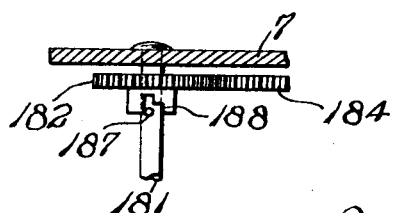

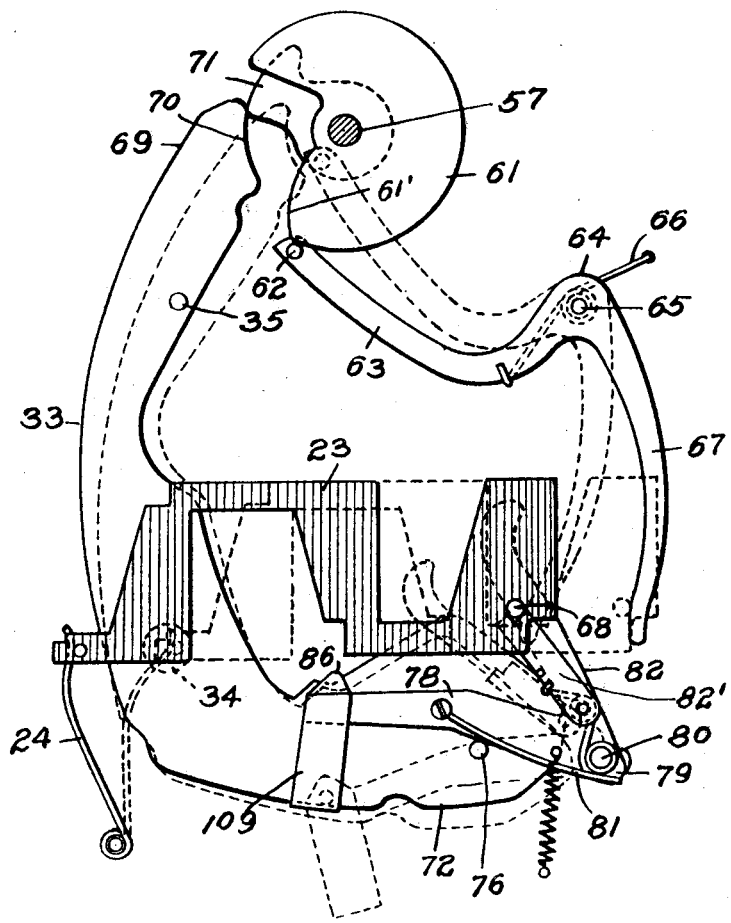

Patented Jan. 13, 1925.

1,522,910

UNITED STATES PATENT OFFICE.

PAUL RICHERT, OF NEW YORK, N. Y., ASSIGNOR OF ONE-FOURTH TO JOHN W. WEIBLEY, ONE-FOURTH TO CHARLES A. BLANCHARD, AND ONE-FOURTH TO GRANT McCARGO, ALL OF PITTSBURGH, PENNSYLVANIA.

TAXIMETER.

Application filed April 18, 1922. Serial No. 555,332.

*To all whom it may concern:*

Be it known that I, PAUL RICHERT, a citizen of the United States, and a resident of New York, in the county of New York and the State of New York, have made a new and useful Invention in Taximeters, of which the following is a specification.

The invention relates to recording and indicating devices and it has particular relation to taximeters.

One of the objects of the invention is to simplify the construction, assembly and operation of meter mechanisms, of the character described, by providing a single instrumentality for simultaneously actuating various portions of the meter mechanism and accurately synchronizing the movements thereof.

Another object of the invention is to provide a taximeter provided with a clockwork mechanism adapted to operate the meter during a period in which the vehicle is at rest and which may be readily detached from the meter without interfering with the operation of those portions of the meter called into play when the vehicle is in motion.

A further object of the invention is to provide a meter of the character described which embodies a quick-acting shutter adapted to conceal the indicating discs of the meter from view when the vehicle is not operating for hire.

A still further object of the invention is to provide a device of the character designated having simple and accurate means for establishing a driving connection between the clockwork mechanism and the other meter mechanism, thereby insuring that the person hiring the vehicle is not overcharged.

Another object of the invention is to provide a meter, of the class designated, which is very rugged in construction and that is very difficult to tamper with.

With these, as well as other, objects in view the invention consists in the parts and combinations thereof hereinafter set forth and claimed, with the understanding that various elements may be varied without departing from this invention.

In the accompanying drawings:—

Figure 1 is a front elevational view of a taximeter constructed in accordance with the invention with the parts in the positions that they occupy when the vehicle is not hired.

Fig. 2 is a view similar to Fig. 1, but with the parts moved to the positions they occupy when the vehicle is operating for hire.

Fig. 3 is a rear elevational view of the device with the parts in the positions illustrated in Fig. 2.

Fig. 4 is a vertical longitudinal sectional view, on an enlarged scale, taken on line IV—IV of Fig. 2.

Fig. 12 is a bottom plan view of the tabulating mechanism of the meter.

Fig. 13 is a bottom plan view of the driving connection between the clockwork and meter mechanisms.

Fig. 14 is a fragmentary sectional view of the mechanism for releasing one of the indicating disks to permit the same to be subsequently moved to its initial or zero position.

Fig. 15 is a detail view of the shutter actuating mechanism.

Fig. 16 is an elevation and Fig. 17 is a plan view of one of the driving gears showing its lost motion connection with the supporting shaft.

Figure 5:
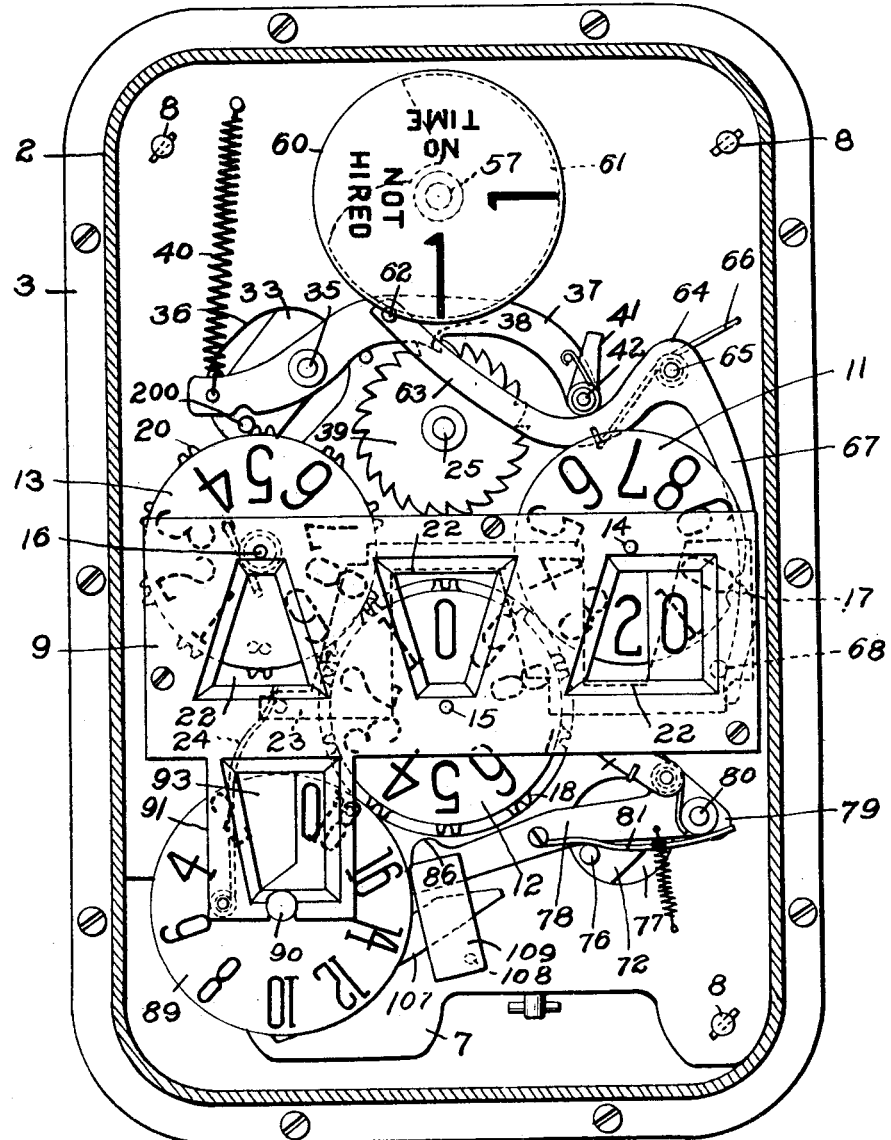
Fig. 5 is a vertical transverse sectional view taken on line V—V of Fig. 4 and illustrating the interior mechanism of the meter in elevation.

Referring to the drawings, the casing of a taximeter, constructed in accordance with this invention, is shown as comprising a back portion or base plate 1 to which a pressed metal casing or housing 2 is secured by means of an outwardly extending peripheral flange 3 formed on the casing 2. A gasket 4 is disposed between the flange 3 and the base plate 1 to exclude moisture and foreign matter from the interior of the casing and the delicate mechanisms contained therein. The casing 2 is provided with a transparent front wall 5 upon which the various inscriptions and legends are indicated.

The base plate 1 is provided with a window 6 through which the tabulating mechanisms may be conveniently observed by the driver of the vehicle.

The frame of the meter mechanism comprises a plate 7 which is mounted upon the base plate 1 and in spaced relation therewith by means of studs 8 and upon which a plate 9 is supported by means of studs 10. A plurality of intermittently rotatable fare indicating disks 11, 12 and 13 are mounted between the plates 7 and 9 by means of shafts 14, 15 and 16 respectively, which are each journaled at their rear and forward ends in the plates 7 and 9.

An interrupted gear 17 is fixed to the shaft 14 and periodically intermeshes with a similar gear 18 carried by the shaft 15. The shaft 15 is also provided with an interrupted gear 19 which meshes with a similar gear 20 mounted upon the shaft 16. The shaft 15 is slidably mounted in its bearings and is adapted to be moved a slight distance in an axial direction to disengage the gears 18 and 19 from driving connection with the gears 17 and 20, as will be hereinafter described. A spring 21 embraces the rear portion of the shaft 15 and tends to maintain the various gears in operative engagement with each other.

The gears 17, 18, 19 and 20 are so constructed that upon each complete revolution of the gear 17, the gear 18 will advance one step and upon each complete revolution of the gear 18 the gear 19, which moves therewith, will cause the gear 20 to be in turn advanced a single step.

The plate 9 is provided with a plurality of apertures or windows 22, through which the occupant of the vehicle may observe the amount of the fare displayed by the various indicating disks. A shutter 23 is slidably mounted upon the back of the plate 9 in suitable guides and is provided with a plurality of apertures which are adapted to register with the windows 22 in the plate 9. A spring 24 tends to maintain the shutter 23 in an open position and against the action of which the shutter 23 is closed, as will be hereinafter set forth.

A shaft 25 is journaled at its forward end in the plate 7 and at its rear extremity in a plate 26 which is mounted upon the back of the plate 7 and in spaced relation therewith, by means of studs 27. A gear 28 is mounted upon the shaft 25 for driving connection therewith, when rotated in one direction, and for free movement thereon, when rotated in the opposite direction, by means of a suitable ball clutch mechanism 29. The gear 28 is rotated by means of a worm 30 fixed to the upper end of a vertically extending main drive shaft 31 which is journaled at its upper and lower extremities, in brackets 32 which are secured to the back of the plate 7.

The lower end of the shaft 31 is adapted to be operatively connected to the usual flexible shaft by means of suitable reduction and timing gearing, not shown.

A master or control lever, indicated as a whole by the numeral 33, is pivotally mounted upon the back of the plate 7 as at 34 and is provided with a stud shaft 35 which extends forwardly through an opening 36 formed in the plate 7.

A lever 37 is pivotally mounted upon the stud shaft 35 and adjacent to the forward face of the plate 7 and is provided with a cam surface or tooth 38 which is engaged by a ratchet wheel 39 fixed to the forward end of the shaft 25. The cam 38 is yieldably maintained in engagement with the teeth of the ratchet wheel 39 by means of a spring 40 which is attached to one arm of the lever 37.

Figure 6:
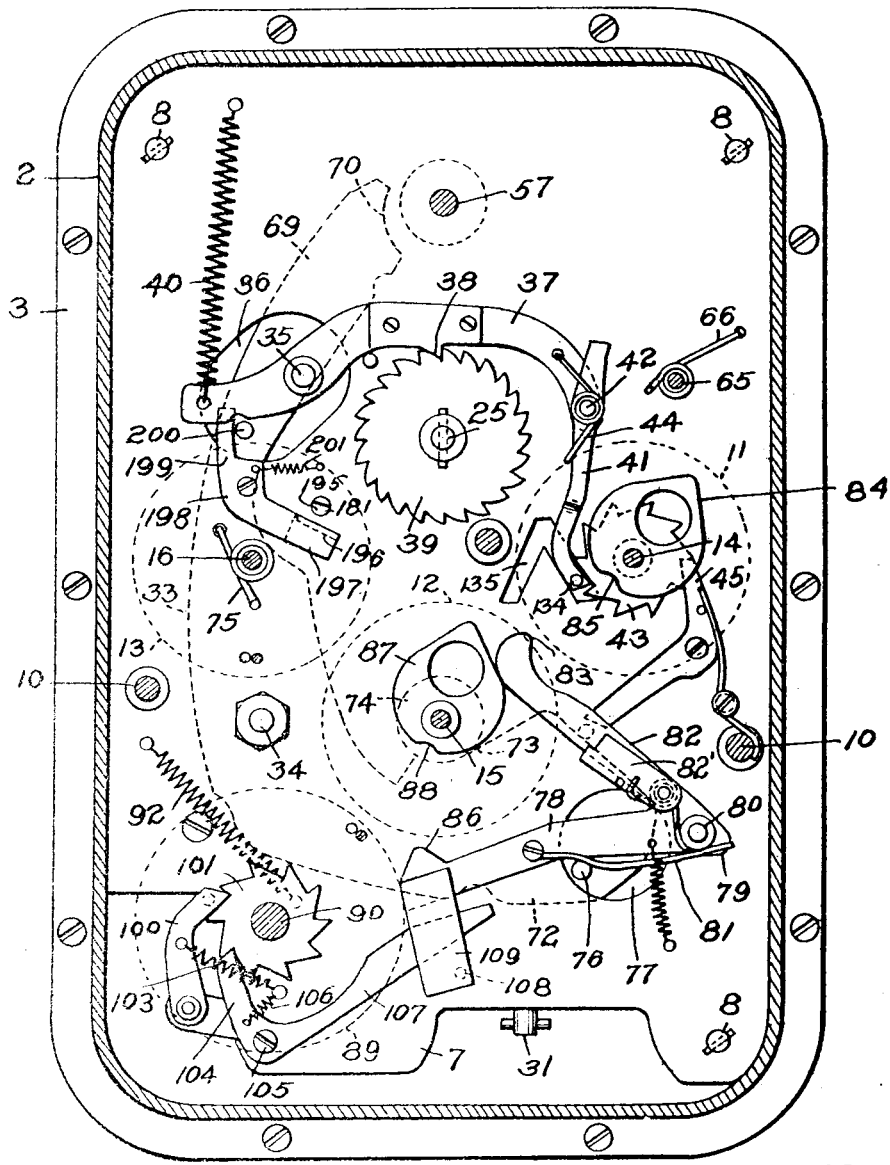
Fig. 6 is a vertical transverse sectional view taken on line VI—VI of Fig. 4 and illustrating the mechanism for actuating the indicating disks.

A downwardly extending pawl 41 is pivotally mounted upon the other arm of the lever 37 by means of a forwardly extending pin 42, and is yieldably maintained in engagement with a ratchet wheel 43 carried by the shaft 14 of the indicating disk 11 by means of a spring 44, as is best shown in Fig. 6.

When the vehicle is in operation and the meter mechanism is set to register the fare, as will be presently described, the shaft 31 and the worm 30 will cause the relatively slow rotation of the gear 28 and the shaft 25. The ratchet wheel 39 carried by the shaft 25 will be consequently rotated and the teeth thereof will co-act with the cam 38 to effect the intermittent oscillation of the lever 37. This movement of the lever 37 will, in turn, cause the pawl 41 to impart a step by step rotary movement to the ratchet wheel 43 and a retaining pawl 45 prevents the backward rotation of the ratchet wheel 43. The shaft 14, disk 11 and gear 17 will, therefore, be caused to rotate and to periodically transmit movement to the indicating disks 12 and 13 and their associated parts.

The movements of the various mechanisms are controlled, that is to say thrown into and out of operation, according to whether the vehicle is hired or not, by means of a flag lever 46 which is secured to one end of a stud shaft 47 journaled in the base 1. The forward extremity of the shaft 47 is provided with a ratchet wheel 48, the purpose of which will be hereinafter described.

A member 49 is fixed to the rear face of the ratchet wheel 48 and is provided with a plurality of peripheral depressions 50 which correspond in number to the positions that the flag lever 46 is adapted to occupy. The depressions 50 are engaged by a roller 51 carried by a lever 52 which is pivotally mounted at one end upon the base plate 1 as indicated at 53. The roller 51 is yieldably maintained in engagement with the depressions 50 of the member 49 by means of a spring 54 which is attached to the other end of the lever 52 as at 55 and to the base plate 1 at 56.

By this construction, the mechanism is not only maintained in any of its positions against accidental displacement, such as might be occasioned by the shaking of the vehicle while travelling over a rough thoroughfare, but the operator is enabled to determine by the resistance offered to the movement of the flag lever 46, when the mechanism is set to function as desired.

A shaft 57 is journaled in the plates 7 and 26 and is operatively connected to the shaft 47 by means of a bifurcated arm 58 which is secured to the inner extremity thereof and which engages a pin 59 carried by the ratchet wheel 48. The forward extremity of the shaft 57 is provided with a disk 60 which indicates whether the vehicle is operating for hire or not, or on time, as will be hereinafter set forth. A disk cam 61 is also fixed to the shaft 57 at a point adjacent to the disk 60 and is adapted to engage a pin 62 carried by one arm 63 of a bell crank lever 64 which is pivotally mounted upon the front face of the plate 7, as at 65. A spring 66 tends to maintain the pin 62 of the arm 63 in engagement with the cam 61. The other arm 67 of the lever 64 extends downwardly and is adapted to engage a pin 68 carried by the shutter 23.

If the operator of the vehicle desires to so actuate the meter mechanism as to register "Not hired," as is illustrated in Fig. 1, the flag lever 46 is so moved as to cause the cam 61 to rotate until the low portion thereof will permit the lever 64 to move about its pivot 65 under the action of the spring 66. The depending arm 67 of the lever 64 will consequently be moved into engagement with the pin 68 and force the shutter 23 into a closed position against the action of the spring 24.

This pivotal movement of the lever 64 will also cause the arm 63 thereof to move upwardly and into engagement with the outwardly extending pivot pin 42 of the pawl 41 and lift the lever 37 and cam tooth 38 in a vertical direction, against the action of the spring 40, out of operative engagement with the ratchet wheel 39, thereby disengaging the registering mechanism from the wheels of the vehicle.

If, however, the operator should actuate the mechanism, as above described, when the disks 11, 12 and 13 are in position to indicate a fare, as at the end of a trip, the disks mentioned will be returned to their initial or zero positions by means of the following mechanism.

The control lever 33 is provided with an upwardly extending arm 69, the upper extremity of which is provided with a substantially accurate cam surface 70 which is adapted to be engaged by a cam 71 carried by the shaft 57. When the shaft 57 is rotated by means of the flag lever 46, the cam 71 will co-operate with the cam surface 70 to force the control level 33 about its pivot 34 and cause the lower arm 72 thereof to move in an upward direction. The arm 72 of the control lever 33 is formed with a cam surface 73 which is adapted to engage the beveled periphery of a circular cam 74 carried by the shaft 15. The shaft 15 is slidably mounted in its bearing, as has been previously pointed out, and therefore when the cam surface 73 of the lever 33 engages the cam 74, the shaft 15 will be shifted rearwardly, against the action of the spring 21, disengaging the gears 18 and 19 from the gears 17 and 20.

The shaft 16 of the disk 13 is provided with a spring 75 which is adapted to rotate the same back to its initial or zero position when the gear 19 is disengaged from the gear 20 carried thereby. The arm 72 of the control lever 33 is provided with a pin 76 which extends forwardly through an opening 77 in the plate 7 and engages an arm 78 of a substantially V-shaped bell crank lever 79 which is pivotally mounted upon the front face of the plate 7 as at 80. The lever 79 is biased in a downward direction and against the pin 76 by means of a relatively strong spring 81 and assists in maintaining the cam surface 70 of the control lever 33 in operative engagement with the cam 71. The other arm 82 of the lever 79 extends in an upward and inward direction and is provided with a pointed projection 83 which is adapted to engage the periphery of a substantial heart shaped cam 84 which is formed with a depression 85 and which is eccentrically mounted upon the shaft 14 of the indicating disk 11. The extremity of the lower arm 78 of the lever 79 is also provided with a pointed projection 86 which is similarly adapted to engage the periphery of a heart shaped cam 87 formed with a peripheral depression 88 and which is fixed to the shaft 15 of the indicating disk 12. When the disks 11 and 12 are occupying a zero position, the depressions or low portions 85 and 88 of the cams 84 and 87 respectively, are in alignment with the projections 83 and 86 of the lever 79. If, however, the disks 11 and 12 are in positions to register a fare, the high portion of the cams 84 and 87 will extend toward the projections 83 and 86.

If the meter mechanism is set to register a fare, the cam 87 is disposed without the plane of the projection 86 but when the cam 71 is rotated by means of the flag lever 46, the control lever 33 will be caused to simultaneously shift the shaft 15 in a rearward direction, as previously described, and move the cam 87 into the plane of the projection 86 and to rock the lever 79 about its pivot 80. The movement of the lever 79 causes the projections 83 and 86 to bear against the cams 84 and 87 and to rotate them until the projections 83 and 86 engage the depressions 85 and 88 thereof and lock the disks 11 and 13 in their zero positions.

From an inspection of the drawings and particularly of Fig. 15 thereof, it will be observed that when the lever 64 is released by the cam 61 and is actuated by the spring 66 to close the shutter 23 the action is very rapid by reason of the abrupt termination of the cam 61. The lever 64 is, however, moved comparatively slowly in the opposite direction by the cam 61 by reason of the gradual inclination of the shoulder 61'. The arm 67 of the lever 64 would therefore have a tendency to retard the opening movement of the shutter 23. To obviate this difficulty and to effect a correspondingly rapid opening movement of the shutter 23, a spring pressed pawl or latch member 82' provided with a notched extremity is pivotally mounted upon the arm 82 of the lever 79. After the shutter 23 has been moved to its closed position, as has been previously explained, and the lever 79 is subsequently actuated to return the disks 11 and 13 to their initial position, the movement of the lever 79 carries the extremity of the latch member 82' behind and into the path of movement of the pin 68. When the parts are in the positions outlined above, the depending arm 67 of the lever 64 may move out of engagement with the pin 68 and to the position indicated by full lines in Fig. 15 and the latch member 82' will function to maintain the shutter in a closed position. If the lever 79 is subsequently actuated to release the disks 11 and 13 the movement thereof carries the latch 82' out of engagement with the pin 68 and permits the shutter 23 to quickly open under the action of the spring 24. By means of the mechanism described, a very rapid opening and closing movement of the shutter 23 is effected.

The extra fares are indicated upon a disk 89 which is mounted upon the shaft 90, journaled at each end in the plate 7 and a downwardly extending portion 91 of the plate 9. A spring 92 is secured to the shaft 90 and to the plate 7 and is adapted to be wound upon the shaft when the same is rotated and which tends to maintain the disk 89 in its zero position. The downwardly extending portion 91 of the plate 9 is provided with an aperture or window 93 through which the numerals upon the disk 89 may be readily observed by the occupant of the vehicle. The disk 89 may be set to indicate the proper amount by means of a shaft 94 which is rotatably mounted in the base plate 1 and the plate 7. The shaft 94 is provided with a suitable knob or handle 95 by means of which the same may be manipulated by the operator.

The forward extremity of the shaft 94 is provided with a transversely extending pin 96 which is adapted to engage a lever 97 formed with a notch 98 and which is pivotally mounted upon the rear face of the plate 7 as indicated at 99. A pawl 100 is pivotally mounted upon the outer end of the lever 97 for engagement with a ratchet wheel 101 fixed to the shaft 90. A coiled spring 102 tends to maintain the lever 97 in a raised position and a similar spring 103 is adapted to bias the pawl 100 towards the teeth of the ratchet wheel 101. Upon every one half revolution of the shaft 90 the pin 96 forces the lever 97 in a downward direction until the pin slips into the notch 98 thereof and allows the lever 97 to quickly return to its upward position under the action of the spring 102. The upward motion of the lever 97 causes the pawl 100 to advance or rotate the ratchet wheel 101 one tooth and the shaft 90 and indicating disks 89 an equal fractional part of a revolution. The ratchet wheel 101 is prevented from rotating in a backward direction by means of a pawl 104 which is pivotally mounted upon the plate 7 at 105 and which is yieldably maintained in engagement with the teeth of the ratchet wheel 101 by means of a spring 106.

The pawl 104 is provided with an arm 107 which extends into the path of a pin 108 carried by a bar 109 fixed to the extremity of the arm 78 of the V-shaped lever 79. When the mechanism is set at "Not hired" and the lever 79 is actuated to return the fare indicating disks 11 and 12 to the zero positions, as previously described, the pin 108 engages the arm 107 of the pawl 104 and disengages the same from the ratchet wheel 101. As the pawl 104 moves away from the ratchet wheel 101, it engages the edge of the pawl 100 and moves it also out of operative engagement with the ratchet wheel 101. The shaft 90 and the disk 89 are then free to return to their initial zero position under the action of the spring 92.

In order that the operator may determine by sense of touch, when the extra indicating disk 89 displays the desired notation, the shaft 90 is provided with a double acting cam 110 formed with diametrically disposed shoulders 111 and against which bears a spring finger 112. Upon every one half revolution of the shaft 90 the spring finger 112 snaps over one of the shoulders 111 thereof and causes a slight jar which may be noticed by the operator through the handle 94. A ratchet wheel 113 is also fixed to the shaft 90 and is engaged by pawls 114 and 115 to prevent the backward movement of the shaft 90 and its associated parts.

The units, total miles, trips, pay miles and extras are separately and independently recorded by means of a tabulating mechanism consisting of a plurality of counter wheels 116, 117, 118, 119 and 120 respectively, each of which is provided with a gear toothed portion 121 and which are rotatably mounted upon a common shaft 122, journaled at each end in a frame 123 secured to the rear of the plate 7 by means of studs 124. The counter wheels of the unit group 116 are intermittently rotated by means of a gear wheel 125 carried by a vertically extending portion 126 of the frame 123 and which meshes with the tooth portion 121 of one of the counter wheels 116. A ratchet wheel 127 is fixed to the gear wheel 125 and an intermittent rotary movement is imparted thereto by means of a pawl 128 which is pivotally mounted upon the end of an arm 129 of a bell crank lever 130 which is in turn pivotally mounted, as at 131, upon the vertically extending portion 126 of the frame 123. The other arm 132 of the lever 130 extends forwardly and is provided with a pin 133 which extends into the path of movement of a pin 134 carried by the pawl 41 and which projects rearwardly through a slot 135, of substantially inverted V-shape, formed in the plate 7. The lever 130 is biased about its pivotal connection, in a clockwise direction, by means of a spring 136 and the backward rotation of the ratchet wheel 125 is prevented by means of a spring pressed pawl 137. By this construction, the counter wheels 116 are caused to register simultaneously with the indicating disks 11, 12 and 13.

The group of counter wheels 117, which register the total miles traveled by the vehicle, are actuated by means of a gear wheel 138 which meshes with the gear portion 121 of one of the wheels 117 and which is carried by a horizontally extending shaft 139, journaled in downwardly extending portions 140 and 141 respectively of the frame 123, and in a bracket 142 secured thereto. The gear wheel 138 meshes with and is driven by a pinion 143 fixed to a gear wheel 144 mounted upon the bracket 142. The gear wheel 144 in turn meshes with and is driven by a worm wheel 145 fixed to the vertically extending main drive shaft 31.

The counter wheels 118 which indicate the trips made by the vehicle during the day, month or other set period of time, are actuated by means of a gear wheel 146 which meshes with and drives the geared portion 121 of one of the counter wheels 118 and which is rotatably mounted upon the shaft 139. The gear wheel 146 is provided with a ratchet portion 147 which is intermittently rotated by means of a spring pressed pawl 148 carried by a lever 149 which is pivotally mounted as at 150 upon the downwardly extending portion 140 of the frame 123. The lever 149 extends forwardly and into the path of movement of the arm 151 of a lever 152 which is pivotally mounted upon a rearwardly extending stud 153 carried by the plate 7. A spring 154 tends to maintain the lever 149 in a raised position in which it will support the arm 151 of the lever 152 and maintain the other arm 155 in engagement with a pin 156 carried by the arm 72 of the control lever 33.

Figure 8:
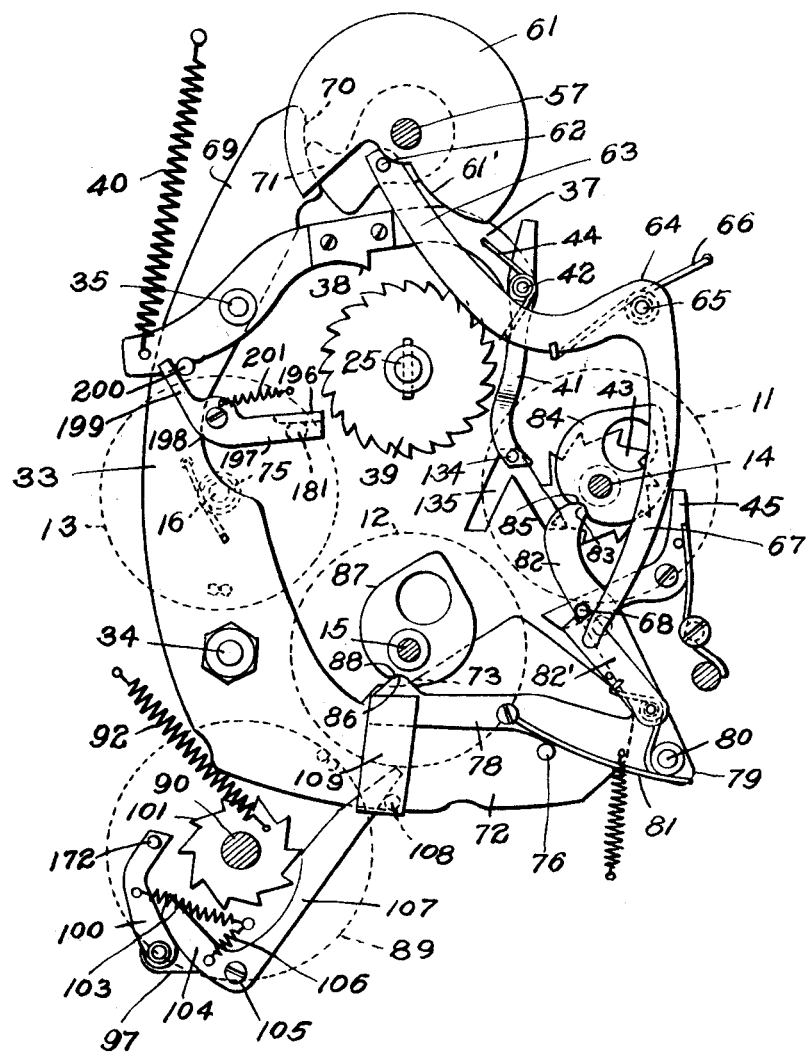
Fig. 8 is a view of the mechanism illustrated in Figs. 6 and 7 with the supporting frame removed and showing the parts in the positions that they occupy when the vehicle is operating for hire.

During the period when the vehicle is "not hired," and the meter mechanism is correspondingly set, the cam 71 maintains the control lever 33 in the position illustrated in Fig. 8, in which position the pin 156 carried by the lower arm 72 thereof will support the arm 151 of the lever 152 and maintain the other arm 155 thereof and the lever 149 in a depressed position against the action of the spring 154. As soon, however, as the flag lever 46 is actuated to indicate that the vehicle is operating for hire and the various mechanisms are set accordingly, the cam 71 is moved out of the path of the control lever 33 permitting the same to rock about its pivot 34, as previously described. This movement of the control lever 33 causes the lower arm 72 thereof to swing in a downwardly direction and to permit the lever 152 to be rocked about its pivot 153 by the upward movement of the lever 149 and the spring 154. The upward movement of the lever 149 under the action of the spring 154 causes the pawl 148 to rotate the ratchet wheel 147 one tooth, which in turn causes the rotation of the gear wheel 146 and the counter wheel 118 to register the beginning of a trip.

The total number of "pay miles" that the vehicle travels, during a given period, is recorded by means of the counter wheels 119 which are intermittently actuated by means of a gear wheel 157 which is rotatably mounted upon the shaft 139 and which meshes with the geared portion 121 of one of the counter wheels 119. The gear wheel 157 is provided with a plurality of clutch teeth 158 and are adapted to be engaged by a corresponding toothed portion 159 of a clutch collar 160 which is keyed to the shaft 139, for slidable movement thereon, by means of a slot and pin connection 161.

A lever 162 is pivotally mounted upon the frame 123 and is provided with a pin 163 which extends rearwardly and engages a peripheral groove 164 formed in the clutch collar 160. A spring 165 is secured to the lever 162 and tends to maintain the toothed portion 159 of the clutch collar 160 in engagement with the teeth 158 of the gear wheel 157. The lever 162 is also provided with a pin 166 which extends in a forward direction and into the path of a cam or inclined portion 167 formed in the lower edge of the arm 151 of the lever 152.

Figure 7:
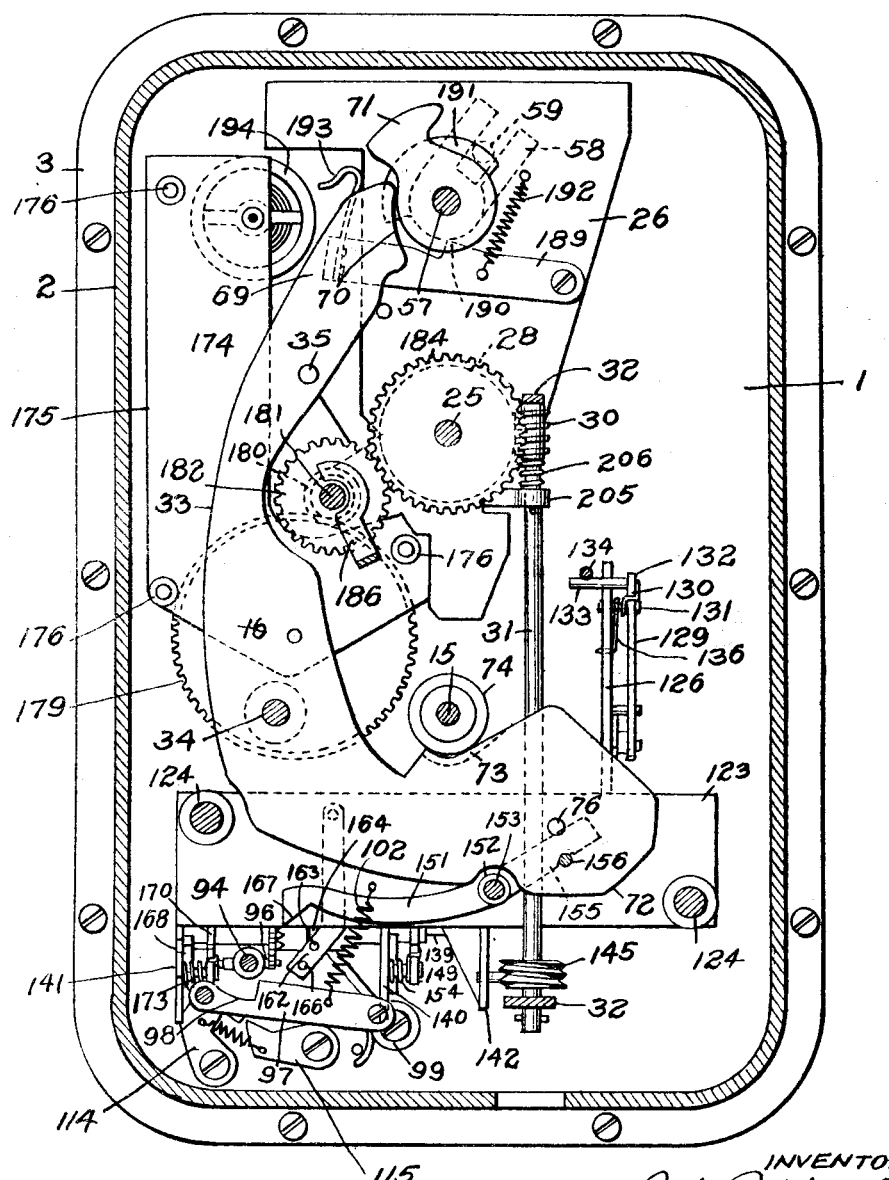
Fig. 7 is a vertical sectional view taken on line VII—VII of Fig. 4 and illustrating the main control lever in the position that it occupies when the meter mechanism is set to function during the period that the vehicle is hired.

When the meter mechanism is actuated, to operate during a period when the vehicle is not for hire, the control lever 33 depresses the arm 151 of the lever 152, as previously described, which action causes the cam portion 167 thereof to engage the pin 166 and to move the clutch collar 160 out of operative engagement with the gear wheel 157. The counter wheels 119 of the "pay miles" group therefore ceases to register during a period when the vehicle is not hired. When, however, the meter mechanism is actuated to register a fare, the control lever 33 is moved so as to permit the arm 151 of the lever 152 to raise under the action of the lever 149 and spring 154 and to disengage the cam portion 167 thereof from the pin 166 of the lever 162 (Fig. 7). When thus released, the clutch collar 160 is immediately moved into engagement with the toothed portion 158 of the gear wheel 157 under the action of the spring 165. The counter wheels 119 of the "pay mile" group are thereby temporarily fixed to the shaft 139 and are caused to record the mileage traveled by the vehicle during a period of hire in synchronism with the counter wheels 117 of the "total miles" group.

The counter wheel 120 of the "extras" group is independently actuated by means of a gear wheel 168 which is rotatably mounted upon the shaft 139 and which meshes with the gear teeth 121 of one of the counter wheels 120. The gear wheel 168 is provided with a ratchet wheel 168ª which is intermittently rotated by means of a pawl 169ª carried by a lever 170 which is pivotally mounted upon the downwardly extending portion 141 of the frame 123. The extremity of the lever 170 is formed with a lip portion 171 which is adapted to be engaged by a pin 172 carried by the pawl 100. A spring 173 tends to maintain the lever 170 in a raised position and the lip portion 171 thereof in engagement with the pin 172.

Whenever the pawl 100 is actuated by its associated mechanism, to cause the extra disk 60 to indicate an extra fare, the pin 172 rocks the lever 170 about its pivot and causes the pawl 169, carried thereby, to advance the ratchet wheel 168 and gear 167 one step. The counter wheels 120 are thereby caused to register the number of extra fares indicated upon the face of the disk 60.

The meter mechanism, hereinbefore described, with the exception of the extra mechanism, functions only when the vehicle is in motion. In order, therefore, that the meter will function during a period when the vehicle is hired but not in motion, there is provided a clockwork mechanism indicated as a whole by the numeral 174. The clockwork mechanism comprises, in general, a frame 175 which is detachably mounted upon the rear of the plate 7 by means of studs 176. A knob or handle 177 is mounted in the base plate 1 of the casing and is provided with a socket adapted to removably engage the squared end of the winding stem 178 of the clockwork mechanism. One of the gear wheels 179 of the clockwork mechanism meshes with and drives a pinion 180 which is mounted upon a shaft 181 which is journaled at its respective ends in axial slidable movement in the plates 7 and 26.

A gear wheel 182, provided with a hub portion 183, is loosely mounted upon the shaft 181 and meshes with and drives a larger gear wheel 184 which is mounted upon the shaft 25 and adjacent to the gear 24 by means of a suitable ball clutch mechanism 185. The gear 182 is maintained in alignment with the gear wheel 184 during the sliding movement of the shaft 181, by an overhanging finger or strap 186 which is secured to the plate 7.

The shaft 181 is provided with a pin 187 which is adapted to engage a relatively deep slot 188 formed in the hub 183 of the gear wheel 182, and formed with a relatively wide portion to permit a small amount of lost motion between the pin 187 and the hub 183. When the vehicle is in motion during a period of hire, the main drive shaft 31 and worm gear 30 will rotate the gear 28 and shaft 25 along with the gear 184 actuated by the clockwork mechanism, but if the vehicle should come to a stop the movement of the drive shaft 31 and associated parts will also stop. The movement of the meter mechanism will, however, be continued by the clockwork mechanism and gear 184.

A lever 189, Fig. 7, is pivotally mounted upon the plate 26 and is formed with a projection 190 which is resiliently held in contact with a shouldered cam 181 carried by a shaft 57, by means of a spring 192. A spring finger 193 is fixed to the outer end of the lever 189 and adjacent to the balance wheel 194 of the clockwork mechanism.

When the flag lever 46 is actuated to cause the meter mechanism to cease functioning during a period when the vehicle is not operating for hire, the cam 191 is partially rotated and depresses the lever 189. The downward movement of the lever 189 causes the spring finger 193 to resiliently engage the balance wheel 194 of the clockwork mechanism and discontinue the operation thereof. By this construction the clockwork mechanism is prevented from running down and eliminates the necessity of frequent windings. If it is desired to start the clockwork mechanism to function, the cam 191 is rotated until the disk 60 indicates that the vehicle is "Hired", in which position the projection 190 snaps over the shoulder of the cam 191. The lever 189 is thereby released from its depressed position and is moved upwardly under the action of the spring 192. The upward movement of the lever 189 causes the spring finger 193 to snap away from engagement with the balance wheel 194 of the clockwork mechanism imparting to the same an initial impetus, starting the same to function.

The forward end of the shaft 181 is beveled, as indicated at 195, and is adapted to be engaged by a cam surface 196, Fig. 6, provided on an arm 197 of a bell crank lever 198 which is pivotally mounted upon the forward face of the plate 7. The other arm 199 of the lever 198 extends upwardly and is adapted to be engaged by a pin 200 carried by the control lever 33 and which extends, in a forward direction, through the aperture 36 in the plate 7. A spring 201 tends to maintain the arm 199 of the lever 198 in engagement with the pin 200.

When the mechanism is manipulated so as not to function when the vehicle is not for hire and the cam 71 is moved into engagement with the control lever 33, the lever 33 and pin 200 will move outwardly and will force the cam surface 196 of the arm 197 of the bell crank lever 198 into engagement with the beveled extremity 195 of the shaft 181 which in turn forces the same in a rearward direction. The rearward movement of the shaft 181 disengages the pin 187, carried thereby, from the narrow portion of the slot 188, formed in the hub 183 of the gear wheel 182, but does not disengage the same from the wide portion thereof.

A lever 202 is pivotally mounted at its middle, as at 203, upon a bracket 204 secured to the rear face of the plate 26. One arm of the lever 202 engages the rear end of the shaft 181 and the other arm thereof is adapted to be engaged by an arm or finger 205 which is frictionally mounted upon the main drive shaft 31 by means of a spring 206. Whenever the vehicle is in motion and the drive shaft 31 is rotating, the finger 205 is yieldably maintained in engagement with the lever 202 and tends to force the shaft 181 in a forward direction and the pin 187 into the narrow portion of the slot 188. If, however, the vehicle is not for hire, as previously explained, the lever 198 prevents the forward movement of the shaft 181 during such a period.

As soon as the meter mechanism is set to function during a period of hire, the lever 198 is released and the spring 201 moves the same out of engagement with the end 195 of the shaft 181. If the vehicle is stationary at the time, the shaft 31 and finger 205 remain motionless and the shaft 181 is not moved. The clockwork mechanism is however started by means of the lever 189 and spring finger 193, as previously described. By reason of the fact that the shaft 181 has not yet been moved axially, the pin 187 is disposed in the wide portion of the slot 188 of the hub 183 and a certain amount of lost motion therefore exists between the clockwork mechanism and the gear wheel 184. The movement of the clockwork mechanism is however comparatively slow and a short period of time elapses before the lost motion between the parts is taken up.

The amount of lost motion existing between pinion 180 and the shaft 181, is determined by the width of the wide portion of the slot and varies according to the regulations and the particular jurisdiction in which the vehicle is operated. For example, if the vehicle is operating in a locality where regulations specify that the maximum charge shall be ten cents (10¢) for every four minutes that a vehicle is waiting after having been engaged, and where the initial fare is twenty cents (20¢) the wide portion of the slot should be of such width that four minutes will elapse before the lost motion is taken up and the meter mechanism is set in motion by the clockwork mechanism.

By this arrangement, the operation of the meter is accurately timed automatically and eliminates the element of personal carelessness on the part of the driver of the vehicle in correctly determining the time that the vehicle is waiting for a passenger after having been engaged, that might otherwise result in an under or overcharge.

Immediately that the vehicle is set in motion, the shaft 31 carries the finger 205 into engagement with the lever 202 and causes the same to move the shaft 181 forwardly and the pin 187 into the narrow portion of the slot 188 thereby eliminating all lost motion. The shaft 181 and pin 187 remain in this position, after once engaged, even though the vehicle makes a stop, and is only moved rearward by the arm 197 when the hired period is terminated and the meter mechanism is correspondingly actuated.

A pawl 207 is yieldably maintained in operative engagement with the ratchet wheel 48 by means of a spring 208 and is adapted to engage a series of teeth 209. The teeth 209 of the ratchet wheel 48 are so positioned that the backward movement of the parts from a "Hired" position to a "Not hired" position at the conclusion of a trip, is prevented without first causing the return of the indicating disks to their zero or initial positions. Were it not for this precautionary measure, it would be possible for an unscrupulous driver to return the meter mechanism to a "Not hired" position, at the conclusion of a trip, without canceling the fare displayed by the indicating disks. The fare recorded by the succeeding trip would, therefore, be added to that of the first trip, if the occupant is not observant, and would result in an excess fare which the driver could appropriate without detection.

However, by the ratchet and pawl mechanism above described, the backward movement of the parts and the attendant disadvantages is rendered impossible. Furthermore, the teeth 209 of the ratchet wheel are so formed with respect to the cams 61 and 71 that a backward movement thereof, such as might bend or otherwise injure the levers 33 or 64, is also prevented.

The ratchet wheel 48 is also formed with a shoulder 210 which is adapted to be engaged by a pawl 211 pivoted at 211' when the mechanism has been set to indicate that the vehicle is not operating for hire, and also prevents the forward movement of the flag lever 46. When the parts occupy this position, the teeth 209 are engaged, except for a slight amount of lost movement, by the pawl 207 and prevent the backward movement thereof as previously explained. The meter mechanism is therefore positively locked against accidental displacement.

The pawl 211 is provided with a leaf spring 212 which is in turn provided with a member 213 formed with a cam edge 214 and an inclined rear edge 215 which is adapted to extend over the ratchet wheel 48 and into the path of a pin 216 carried thereby. When the flag lever 46 is moved to set the mechanism in its not hired position and just before the shoulder 210 engages the pawl 211, the pin 216 engages the cam edge 214 of the member 213 and forces the same in a forward direction. Continued movement of the ratchet wheel 48 carries the pin 216 under and past the member 213 which moves back into position behind the pin 216 at the same time that the shoulder 210 engages the pawl 211. When the various parts occupy the positions described, the meter mechanism except for a slight amount of lost motion between the teeth 209 and the pawl 207 (Fig. 9) is positively locked against accidental displacement.

Figure 9:
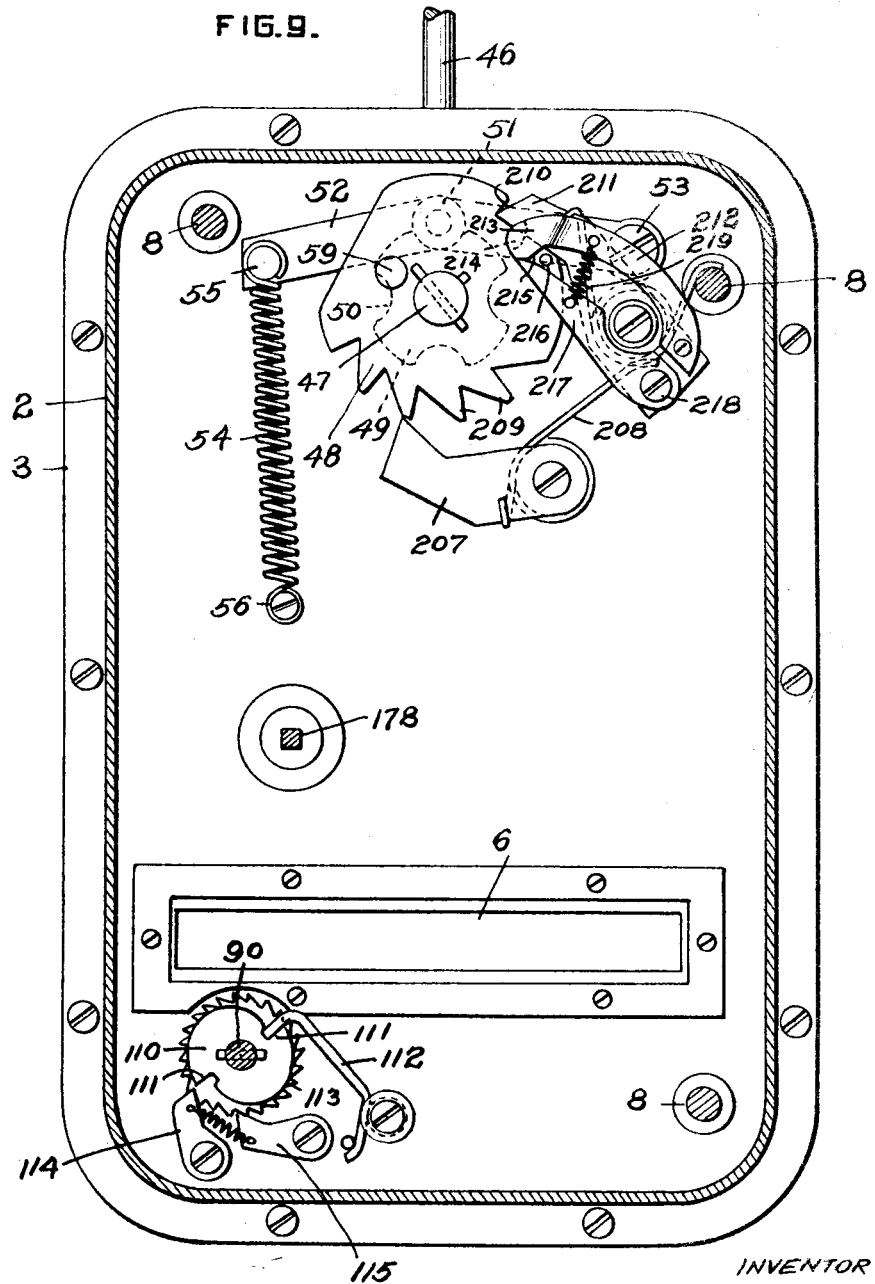
Fig. 9 is a vertical sectional view taken on line IX—IX of Fig. 4 and which illustrates the ratchet and pawl mechanism for controlling the movements of the flag lever.
Figure 10:
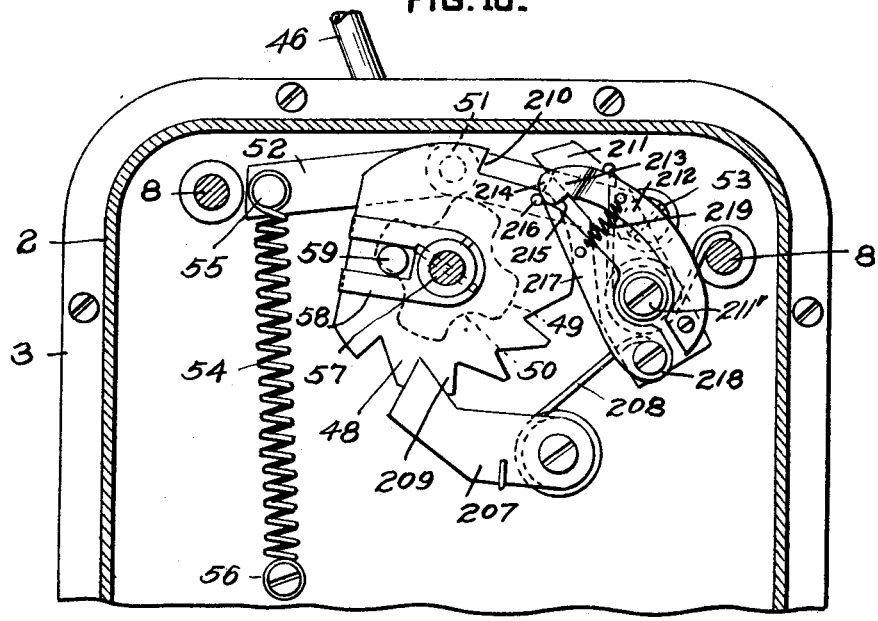
Fig. 10 is a view similar to Fig. 9 but with the parts in a different position.
Figure 11:
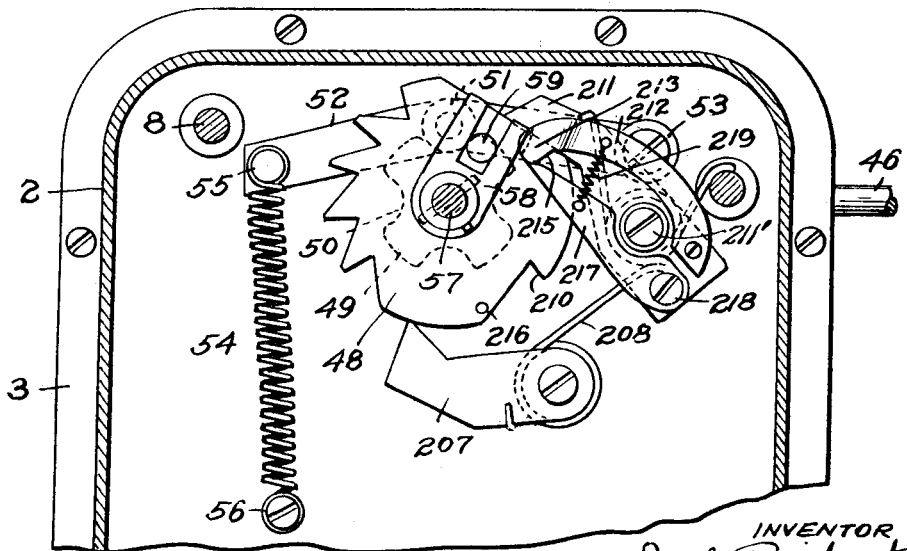
Fig. 11 is a view similar to Figs. 9 and 10 but with the parts occupying still another position.

If it is desired to release the mechanism for the purpose of causing the same to function during a period of hire, the flag lever 46 is first moved in a backward direction, that is to say in a counter clockwise direction as viewed in Figs. 9, 10 and 11, until the lost motion between the teeth 209 of the ratchet wheel 48 and the pawl 207 is taken up. This backward movement of the ratchet 48 causes the pin 216 carried thereby to engage the inclined edge 215 of the member 213 and raises the pawl 211 out of engagement with the shoulder 210 of the ratchet wheel 48. As the pin 216 moves along the inclined edge 215 of the member 213, it engages a spring finger 217, which is pivotally mounted upon the pawl 211 as at 218, and passes between the extremity thereof and the edge of the member 213. The finger 217 then falls back into position behind the pin 216 under the action of a spring 219. At this point the lost motion existing between the teeth 209 of the ratchet wheel 48 and the pawl 207 has been taken up. The flag lever 46 and ratchet wheel 48 are then moved in a forward direction, (clockwise), and the pin 216 engages the lower edge of the finger 217 which causes the pawl 211 to be raised and maintained clear of the shoulder 210 until the pin 216 moves out of engagement with the finger 217, at which time the shoulder 210 has passed the extremity of the pawl 211. The movement of the flag lever 46 may be then continued until the mechanism is set to indicate and record during a period of hire. This movement of the flag lever moves the cam 71 away from the cam surface 70 of the master lever 33 allowing the latter, with its associated mechanism, to assume the position illustrated in Figs. 6 and 7. This causes operative engagement of the lever 37 with the ratchet wheel 39, rotation of which causes a step by step movement of the fare indicating discs through the medium of the pawl 41. The ratchet wheel is driven either from the vehicle through the worm shaft 31 and the worm wheel 28 or by the clock mechanism through the gears 182 and 184, the clock mechanism having been set in motion by upward movement of the spring finger 193 on the lever 191, as above described. At the end of the trip the flag lever is moved to the "Not hired" position, whereupon the cam 71 engages the cam surface 70, as shown in Fig. 8, so as to oscillate the levers 33 and 63 and raise pin 42 and lever 37 so as to disconnect the driving mechanism. This movement of the lever 33 oscillates the lever 79, through the medium of the pin 76, and moves the projections 83 and 86 into contact with the heart-shaped cams 84 and 87, respectively, so as to return the fare indicating discs to their initial positions. The shutter is operated by movement of the flag lever through the medium of the cam 61 operated on the lever 63, which latter also raises the pin 42 to disconnect the driving mechanism as heretofore described.

From the foregoing it will be apparent that the control lever or master 33 not only renders the meter less easily tampered with, but practically controls the operation of the entire mechanism. It controls the movement of the shutter mechanism, throws the indicating disks into and out of engagement and causes their return to initial or zero positions, controls the actuation of the units and " pay mile " group, of the counter wheels, controls the lost motion movement between the clockwork and meter mechanisms, and generally simplifies the construction and operation of the meter.

Furthermore, by this invention is provided a mechanism having a clockwork mechanism which is adapted to operate the meter when the vehicle is not running and which may be readily detached without interfering with the functioning of the device.

The invention also includes a very simple quick acting and effective shutter mechanism which is adapted to conceal the faces of the indicating disks when the vehicle is not hired.

I claim as my invention:

1. A taximeter comprising a plurality of fare-indicating members, driving means therefor adapted to impart an intermittent movement thereto, cancelling mechanism for returning said members to their initial positions, a flag shaft and a single means operated thereby for disconnecting said driving means and actuating said cancelling mechanism.

2. A taximeter comprising a plurality of fare-indicating members, driving means therefor, cancelling mechanism for returning said members to their initial positions, shutter mechanism adapted to obscure said indicating members when in their initial positions, means for both disconnecting said driving means and actuating said shutter mechanisms, and means for actuating said canceling mechanism.

3. A taximeter comprising a plurality of fare-indicating members, driving means therefor, a shutter adapted to obscure said members from view when in their initial positions, and spring-actuated means for disconnecting said driving means and simultaneously closing said shutter.

4. A taximeter comprising a plurality of fare-indicating members, driving means therefor, a shutter adapted to obscure said indicating means from view when in their initial positions, spring-actuated means for disconnecting said driving means and simultaneously closing said shutter and means adapted to open said shutter when said spring-actuated means is moved to connect said driving means.

5. A taximeter comprising a plurality of fare-indicating members, gear mechanism operatively connecting said members, driving means adapted to impart an intermittent movement to said members, concelling mechanism adapted to return said members to their initial positions, and a single member adapted to disconnect said gear mechanism and said driving means and to actuate said cancelling mechanism.

6. A taximeter comprising a plurality of co-operating fare-indicating members, a plurality of interrupted gears operatively connecting said members, driving means for said members, cancelling mechanism adapted to return said members to their initial positions, and means for disconnecting said gears and said driving means and actuating said concelling mechanism.

7. A taximeter comprising a plurality of co-operating fare-indicating members, a plurality of interrupted gears operatively connecting said members, means for driving said members and means for moving said gears out of engagement with each other and disconnecting said driving means.

8. A taximeter comprising a plurality of co-operating fare-indicating members, a plurality of interrupted gears operatively connecting said members and means for moving certain of said gears in an axial direction to disengage said gears from each other.

9. A taximeter comprising a plurality of co-operating fare-indicating members, a plurality of co-operating gears operatively connecting said members, driving means for said members, cancelling mechanism adapted to return said members to their initial positions, and an instrumentality adapted to move certain of said gears in an axial direction to disengage said gears from each other, to disconnect said driving means and to actuate said cancelling mechanisms.

10. A taximeter comprising a plurality of co-operating fare-indicating members, driving means therefor, means for connecting and disconnecting said driving means to and from said members, a cam associated with each of said members, cam operating means cooperating with said cams to return said members to their initial positions and a single master lever for both actuating said connecting and disconnecting means and actuating said cam-operating means.

11. A taximeter comprising a plurality of co-operating fare indicating members, driving means therefor, means for connecting and disconnecting said driving means, a cam associated with each of said members for returning said members to their initial positions, cam operating mechanism and a single lever for both actuating said connecting and disconnecting means and actuating said cam operating mechanism.

12. A taximeter comprising a plurality of co-operating fare indicating members, a plurality of interrupted gears operatively connecting said members, driving means for said members, a cam associated with each of said members, cam operating means therefor adapted to co-operate with said cams to return said members to their initial positions, and a lever for both disconnecting said driving means, moving said gears out of engagement with each other and to actuate said cam operating means.

13. A taximeter comprising a plurality of fare indicating members, a plurality of gears operatively connecting said members, driving means therefor, a cam co-operating with one of said members and adapted to be actuated to return said member to its initial position, cam operating means disposed without the plane of said cam when said gears are in engagement with each other, and means for disconnecting said driving means, disengaging said gears, moving said cam into the plane of said cam operating means and actuating the same.

14. A taximeter comprising a plurality of fare indicating members, a plurality of gears operatively connecting said members, driving means therefor, cancelling mechanism adapted to return said members to their initial positions and disposed out of operative engagement therewith when said gears are in engagement with each other, and means for disconnecting said driving means, disengaging said gears, engaging said cancelling mechanism and actuating the same.

15. A taximeter comprising a plurality of fare indicating members, a plurality of gears operatively connecting said members, driving means therefor, a cam associated with each of said members and said gears and moving therewith and adapted to be moved to return said members to their initial positions, means for operating said cams and means for disconnecting said driving means, moving one of said gears in an axial direction out of engagement with the others and its associated cam into engagement with said cam operating means, and actuating said cam operating means.

16. A taximeter comprising a plurality of fare indicating members, a plurality of gears operatively connecting said members, said gears being mounted for relative movement in an axial direction with respect to each other for disengagement from each other, means for driving said members to indicate a fare, resetting means for returning said members to their initial positions and means for disengaging said gears from each other, disconnecting said driving means and actuating said resetting means.

17. A taximeter comprising a plurality of fare indicating members, a plurality of gears operatively connecting said members, said gears being mounted for relative movement in an axial direction with respect to each other for disengagement from each other, means for driving said members to indicate a fare, and means for disengaging said gears, disconnecting said driving means and returning said gears to their initial position.

18. A taximeter comprising a plurality of fare indicating members operatively connected together, one of said members being movable to disengage said members from each other, a cam associated with said movable members and means adapted to engage said cam to disengage said members.

19. A taximeter comprising a plurality of fare indicating members, driving means therefor, means for operatively connecting said members, a plurality of cams operatively connected to certain of said members and adapted to be actuated to simultaneously return said gears to their initial positions, means for disengaging said members, means for actuating said cams and independent means for resetting one of said members when said members are disengaged from each other.

20. A taximeter comprising a plurality of fare indicating members, driving means therefor, means for operatively connecting said members, a plurality of cams operatively connected to certain of said members and adapted to be actuated to simultaneously return said indicating members to their initial positions, means for disengaging said members, means for actuating said cams and a spring for resetting one of said members when said members are disengaged from each other.

21. A taximeter comprising a plurality of fare indicating members operatively connected together, an independent extra fare indicating member, means for driving said fare indicating members, means for manipulating said extra fare member, means for releasing said fare indicating members and said extra fare indicating member and independent means for simultaneously resetting said fare indicating members and said extra fare indicating member.

22. A taximeter comprising a plurality of cooperating fare indicating members, a plurality of gears operatively connecting said members, driving means therefor, an independently movable extra fare indicating member, means for disconnecting said gears, resetting mechanism for simultaneously returning said members to their initial positions when disconnected from each other and releasing said extra fare indicating member and independent means for resetting said extra fare indicating member when released.

23. A taximeter comprising a plurality of fare indicating members adapted to be operatively connected together, driving means therefor, resetting means for returning said members to their initial positions and a lever adapted to disconnect said driving means, disengage said indicating members and actuate said resetting means.

24. A taximeter comprising a plurality of fare indicating members adapted to be operatively connected together, driving means therefor, resetting means for returning said members to their initial positions and a cam operated lever adapted to disconnect said driving means, disenage said indicating members and actuate said resetting means.

25. A taximeter comprising a plurality of fare indicating members adapted to be operatively connected together, driving means therefor, resetting mechanism adapted to return said members to their initial positions, a shutter adapted to obscure said members from view when in their initial positions, a lever adapted to disconnect said driving means and close said shutter and a separately movable lever adapted to disconnect said indicating members and to actuate said resetting mechanism.

26. A taximeter comprising a plurality of fare indicating members, a plurality of gears operatively connecting said members, driving means therefor resetting mechanism adapted to return said members to their initial positions, and a lever adapted to both move said gears in an axial direction relative to each other to effect the disengagement thereof and to actuate said resetting mechanism.

27. A taximeter comprising a plurality of fare indicating members, a plurality of interrupted gears operatively connecting said members, driving means for said members adapted to impart an intermittent movement thereto, cam operated means for disengaging said gears, cam mechanism for returning said gears to their initial positions, a lever adapted to disconnect said driving means, a separate lever adapted to actuate said cam operated means to disengage said gears and to actuate said cam mechanism to return said members to their initial positions and a plurality of simultaneously movable cams adapted to successively actuate said levers.

28. A taximeter comprising a fare indicating mechanism, a clockwork mechanism, adapted to actuate the same, and a plurality of gears operatively connecting said indicating and said clockwork mechanisms and loosely connected together to permit said clockwork mechanism to operate for a predetermined interval of time before actuating said indicating mechanism.

29. A taximeter comprising a fare indicating mechanism, a clockwork mechanism adapted to actuate the same, a plurality of gears operatively connecting said indicating and said clockwork mechanisms and a pin and slot connection between said gears to permit a limited amount of relative movement therebetween whereby said clockwork mechanism may operate for a predetermined interval of time before transmitting motion to said indicating mechanism.

30. A taximeter comprising a fare indicating mechanism, a clockwork mechanism adapted to actuate the same, a plurality of gears operatively connecting said indicating and said clockwork mechanism, one of said gears being provided with a slot having a relatively wide portion and a relatively narrow portion and the other of said gears being operatively connected to a pin adapted to engage said slot and means for moving said gears in an axial direction relatively to each other to cause said pin to selectively engage the wide and narrow portions of said slot whereby said clockwork mechanism may operate for a predetermined interval of time before actuating said indicating mechanism when the pin is disposed within the wide portion of said slot and immediately actuate said indicating mechanism when said pin is in engagement with the narrow portion of the slot.

31. A taximeter comprising a fare indicating mechanism, cancelling mechanism adapted to return said indicating mechanism to initial position, a flag lever for manually moving said indicating mechanism into and out of operation and to actuate said cancelling mechanism when said indicating mechanism is rendered inoperative, opposed ratchet and pawl mechanisms adapted to normally maintain said flag lever and said indicating mechanism in inoperative positions and means operated by movement of said flag lever for disengaging one of said pawl and ratchet mechanisms so as to permit intentional movement of said flag lever.

32. A taximeter comprising a fare indicating mechanism, cancelling mechanism adapted to return said indicating mechanism to initial position, a flag lever for manually moving said indicating mechanism into and out of operation and to actuate said cancelling mechanism when said indicating mechanism is rendered inoperative, a ratchet wheel associated with said flag lever, a pawl co-operating therewith to prevent said indicating mechanism from being moved to an inoperative position without actuating said cancelling mechanism, locking means for preventing said flag lever from being accidentally actuated to move said indicating mechanism into operative position and means on said ratchet wheel for disengaging said locking means.

33. A taximeter comprising a fare indicating mechanism, cancelling mechanism adapted to return said indicating mechanism to initial position, a flag lever for manually moving said indicating mechanism into and out of operation and to actuate said cancelling mechanism when said indicating mechanism is rendered inoperative, a ratchet wheel associated with said flag lever, a plurality of pawls co-operating therewith, one of said pawls adapted to prevent the backward movement of said flag lever to move said indicating mechanism to inoperative position without actuating said cancelling mechanism, and the other of said pawls adapted to prevent accidental forward movement of said flag lever, said pawls being so positioned with respect to the teeth of said ratchet wheel as to permit of a limited amount of movement of said flag lever in a backward direction to disengage one of said pawls from said ratchet wheel to permit the intentional forward movement of said flag lever.

In testimony whereof, I have hereunto subscribed my name this 5th day of April, 1922.

PAUL RICHERT.